United States Patent [19]

Medem et al.

[11] 4,260,695

[45] Apr. 7, 1981

[54] PROCESS FOR THE PREPARATION OF AROMATIC POLYESTERS

[75] Inventors: Harald Medem; Dieter Freitag, both of Krefeld; Klaus Reinking, Wermelskirchen, all of Fed. Rep. of Germany

[73] Assignee: Bayer Aktiengesellschaft, Leverkusen, Fed. Rep. of Germany

[21] Appl. No.: 963,309

[22] Filed: Nov. 24, 1978

[30] Foreign Application Priority Data

Nov. 29, 1977 [DE] Fed. Rep. of Germany ....... 2753230

[51] Int. Cl.³ .............................................. C08L 75/00
[52] U.S. Cl. .................................... 525/466; 525/461; 525/462

[58] Field of Search ................ 528/176, 197; 560/860; 525/439, 397, 461, 462, 466

[56] References Cited

U.S. PATENT DOCUMENTS

| | | | |
|---|---|---|---|
| 3,819,759 | 6/1974 | Weaver et al. | 525/439 |
| 3,998,908 | 12/1976 | Buxbaum | 260/860 |

*Primary Examiner*—J. Ziegler
*Attorney, Agent, or Firm*—Connolly and Hutz

[57] ABSTRACT

High-molecular polyesters which are distinguished by good processability, a high glass transition temperature, mechanical strength and clear transparency are reproducibly obtained by transesterifying and polycondensing bisphenols with diaryl terephthalates and/or diaryl isophthalates in the presence of an aromatic polycarbonate having a molecular weight of 600 to 15,000.

4 Claims, No Drawings

PROCESS FOR THE PREPARATION OF AROMATIC POLYESTERS

Aromatic polyesters obtained from diphenols and aromatic dicarboxylic acids, especially from bisphenol A (2,2-bis-4-hydroxphenyl)-propane and mixtures of terephthalic acid and isophthalic acid possess very good mechanical, thermal and dielectric properties and are stable, clear and transparent. Their heat resistance and high glass transition temperature are particularly valuable. In respect of these properties, they are even superior to the polycarbonate of bisphenol A.

These aromatic polyesters are materials of construction, for example for machinery components, automobile components, housings, vessels and components of electrical equipment. They can be processed by thermoplastic shaping, such as injection moulding, extrusion and pressing. Films can be produced by the casting method from solutions in chlorohydrocarbons, for example methylene chloride.

A preferred process for the preparation of these polyesters is melt trans-esterification. It is known from British Pat. No. 924,607 to trans-esterify discarboxylic acid diaryl esters with diphenols in the presence of trans-esterification catalysts, by melting the components together and distilling off phenol, to give high-molecular polycondensates. In the course of the reaction, the pressure is greatly reduced, finally to less than 0.1 mm Hg. The reaction temperature is in the range 150°–350° C., preferably 200°–320° C. Suitable transesterification catalysts are, inter alia, n-butyl-o-titanate, antimony trioxide, lead oxide, zinc oxide and hydroxides, hydrides and phenolates of the alkali metals and alkaline earth metals.

Aromatic polyesters have exceptionally high melt viscosities. Hence, the degrees of polycondensation required for good mechanical properties can, in the customary stirred autoclaves, only be achieved laboriously and with poor reproducibility.

To lower the melt viscosity, Belgian Pat. No. 607,557 has proposed adding a mixture of aliphatic dicarboxylic acids and aliphatic dihydroxy compounds. This, however, also lowers the softening points of the polyesters. The reactivity of the aliphatic dicarboxylic acids is too low for quantitative incorporation into the polyester and as a result of the water of reaction which is liberated, the polycondensation is stopped prematurely.

The proposal of DT-AS (German Published Specification) No. 1,745,695, to add to the reaction mixture, during the melt trans-esterification, 15–120% by weight of a polyester comprising terephtalic acid and/or isophthalic acid units and di-primary dialcohols (for example polyethylene terephthalate), also lowers the melt viscosity of the polyesters obtained, but at the same time also lowers the glass transition temperatures. The polyesters are opaque and hence their possible uses are considerably restricted.

The subject of the invention is a process for the preparation of thermoplastic aromatic polyesters having glass transition temperatures abobe 170°C., by transesterification and polycondensation of bisphenols with diaryl terephthalates and/or diaryl isophthalates in the presence of catalysts, which is characterised in that, before or during the reaction, 10–25% by weight, relative to the total weight of the polycondensates, of an aromatic polycarbonate having an average molecular weight $M_n$ of about 600 to 15,000 are added. The aromatic polycarbonate can be added before starting the polycondensation, or during the polycondensation up to the point in time at which 90% of the amount of phenol calculated for residual conversion has been eliminated. Preferably, a point in time between the elimination of 50% of the calculated amount of phenol and of 90% of the calculated amount of phenol is selected for the addition.

Preferred aromatic polyesters obtained according to the invention have glass transition temperatures of 180° to 240° C. The reactants are preferably employed in equimolar amounts.

Using the process according to the invention, it is possible to produce, reproducibly, high-molecular polyesters which are distinguished by good processability, a high glass transition temperature, mechanical strength and clear transparency.

The use of the following biphenols is preferred: bisphenol A (2,2-bis-(4,4'-dihydroxy-diphenyl)-propane, tetramethylbisphenol A, 1,1-bis-(4-hydroxyphenyl)-isobutane, 1,1-bis-(4-hydroxyphenyl)-cyclohexane, 4,4'-dihydroxydiphenyl-sulphide, 4,4'-dihydroxydiphenyl and their dihalogenated and tetrahalogenated derivatives. Bisphenol A is particularly preferred. Preferred diaryl terephthalates and isophthalates are the phenyl, cresyl and naphthyl esters, especially and the phenyl esters. Mixtures of 30–70 mol % of isophthalic acid esters and 70–30 mol % of terephthalic acid esters are particularly preferred.

The aromatic polycarbonates can in principle be synthesised from any bisphenols. However, it is advantageous to use polycarbonates having glass transition temperatures between 130° and 250° C. Homopolycarbonates and copolycarbonates of the abovementioned bisphenols are particularly suitable; bisphenol A polycarbonate is especially preferred.

The average molecular weight $\overline{M}_n$ (number-average) of the polycarbonates to be employed is 600 to 15,000. At higher molecular weights, the lowering of the melt viscosity is too slight to be of practical value.

The amount of the polycarbonates to be added is 10 to 25% by weight, relative to the total weight of the polycondensates (aromatic polyester + aromatic polycarbonate).

Stabilisers, such as, for example, phosphites, UV absorbers, antioxidants, mould release auxiliaries or other additives, to the extent that they are compatible with the polymer compositions, can be added to the melts at any desired points in time.

After completion of the polycondensation, the products can be processed, by melt extrusion and subsequent granulation, to give homogeneous granules. However, the products can also be processed directly by injection moulding, to give shaped articles. They are also suitable for the production of films and coatings.

The relative solution viscosity is determined by measurement on an 0.5% strength solution in $CH_2Cl_2$ at 25° C.; the melt viscosities are determined in a high pressure capillary viscometer at 300° C. and 10 revolutions/sec. The glass transition temperature is determined in a differential thermo-analyser at a rate of heating of 20° K./min.

EXAMPLE 1

114.15 g (0.5 mol) of bisphenol A, 79.5 g (0.25 mol) of diphenyl terephthalate and 79.5 g (0.25 mol) of diphenyl isophthalate were fused, together with 5 mg of disodium bisphenolate, under nitrogen at 180° C. in a 500 ml round flask equipped with a stirrer and descending air-cooled condenser. A vacuum of 100 mm Hg was then applied and the mixture was trans-esterified for 60 minutes at 220° and 30 minutes at 250° C. The pressure was reduced to 20 mm Hg and the trans-esterification was continued for 60 minutes at 250° C. At this point in time, 84% of the calculated amount of phenol had distilled off. The vacuum was cracked by introducing nitrogen into the apparatus. 20 g (=10% by weight) of granular bisphenol A polycarbonate having an average molecular weight $\overline{M}_n$ of 12,000 were introduced. After again applying the vacuum, the mixture was stirred further for 60 minutes at 280° C. and 20 mm Hg and 60 minutes at 320° C. and 0.1-1 mm Hg (oil pump vacuum), and the polycondensation was terminated.

The product obtained was exceptionally hard, clear, transparent and pale yellowish in colour. The solution viscosity $\eta_{rel}$ was 1.31, the melt viscosity was 6,800 Pascal seconds and the glass transition temperature was 191° C.

Comparative experiment 1a

The procedure followed was as in Example 1, but no polycarbonate was added. In this case, the melt wrapped itself on the stirrer and was no longer mixed adequately. The end product had a glass transition temperature of 192° C., but its $\eta_{rel}$ was only 1.24, and the material could be comminuted by striking it with a hammer.

Comparative experiment 1b

The procedure followed was as in Example 1, but instead of the polycarbonate the same amount by weight of polyethylene terephthalate having a solution viscosity of 1.35 (measured on a 1% strength solution in a 50:50 phenol/tetrachloroethane mixture at 25° C.) was introduced. The product obtained was opaque; its solution viscosity was 1.28; the melt viscosity was 5,900 Pas and the glass transition temperature 165° C.

EXAMPLE 2

The procedure followed was as in Example 1, but 45 g (=20% by weight) of the polycarbonate were added. The end product obtained was hard, clear and transparent and had a solution viscosity of $\eta_{rel}=1.29$, a melt viscosity of 5,680 Pas and a glass transition temperature of 184° C.

EXAMPLE 3

The procedure followed was as in Example 2, but a bisphenol A polycarbonate having an average molecular weight $\overline{M}_n$ of 6,200 was introduced. The product obtained was hard, clear and transparent and had a solution viscosity of 1.32, a melt viscosity of 3,200 Pas and a glass transition temperature of 187° C.

EXAMPLE 4

The procedure followed was as in Example 1, but a mixture of 111.3 g (0.35 mol) of diphenyl terephthalate and 47.7 g (0.15 mol) of diphenyl isophthalate was employed and a copolycarbonate of bisphenol A and 4,4'-dihydroxydiphenyl sulphide (in the molar ratio of 60:40) having an average molecular weight $\overline{M}_n$ of 12,600 was used. The resulting product was hard, clear and transparent, and had a solution viscosity of 1.30, a melt viscosity of 2,700 Pas and a glass transition temperature of 183° C.

We claim:

1. In the process of preparing thermoplastic aromatic polymers having glass transition temperatures above 170° C. by reacting a reaction mixture of Bisphenol-A with a member selected from the group consisting of diaryl terephthalates, diaryl isophthalates and mixtures thereof in the presence of a catalyst, the improvement comprises adding to the reaction mixture 10-25% by weight, based on the total reactants' weight, of an aromatic polycarbonate having an average molecular weight of 600 to 15,000 and a glass transition temperature of 130° to 250° C.

2. The process of claim 1 wherein the aromatic polycarbonate is a polycarbonate of bisphenol A.

3. The process of claim 1 wherein the member selected from the group is a mixture of diaryl isophthalate and diaryl terephthalate in a molar ratio of 30:70 to 70:30.

4. The process of claim 1 wherein said member selected from said group is a mixture of diphenyl isophthalate and diphenyl terephthalate.

* * * * *